US012619859B2

(12) United States Patent
Lee et al.

(10) Patent No.: US 12,619,859 B2
(45) Date of Patent: May 5, 2026

(54) METHOD AND APPARATUS WITH QUANTIZED LOOK UP TABLE FOR NEURAL NETWORK OPERATION

(71) Applicants:Samsung Electronics Co., Ltd., Suwon-si (KR); IUCF-HYU (Industry-University Cooperation Foundation Hanyang University), Seoul (KR)

(72) Inventors: Donghyun Lee, Seongnam-si (KR); Joonsang Yu, Seoul (KR); Junki Park, Suwon-si (KR); Jungwook Choi, Seoul (KR)

(73) Assignees: Samsung Electronics Co., Ltd., Suwon-si (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 935 days.

(21) Appl. No.: 17/887,183

(22) Filed: Aug. 12, 2022

(65) Prior Publication Data

US 2023/0118505 A1     Apr. 20, 2023

(30) Foreign Application Priority Data

Oct. 18, 2021     (KR) ........................ 10-2021-0138434

(51) Int. Cl.
        *G06N 3/08*        (2023.01)
        *G06F 1/03*        (2006.01)
        (Continued)
(52) U.S. Cl.
        CPC .............. *G06N 3/048* (2023.01); *G06F 1/03* (2013.01); *G06N 3/084* (2013.01)

(58) Field of Classification Search
        CPC .................................. G06N 3/084; G06F 1/03
        See application file for complete search history.

(56) References Cited

U.S. PATENT DOCUMENTS 6,191,788 B1     2/2001  Fuller
8,356,066 B1     1/2013  Verma
                (Continued)

FOREIGN PATENT DOCUMENTS

KR      10-2021-0045287 A      4/2021
KR      10-2022-0157619 A      11/2022

OTHER PUBLICATIONS

Raha, Arnab, and Vijay Raghunathan. "qLUT: Input-aware quantized table lookup for energy-efficient approximate accelerators." ACM Transactions on Embedded Computing Systems (TECS) 16.5s (2017): 1-23. (Year: 2017).*
                (Continued)

*Primary Examiner* — Hal Schnee
(74) *Attorney, Agent, or Firm* — NSIP Law

(57)        ABSTRACT

A neural network operation apparatus may include a receiver configured to receive input data to perform the neural network operation and a quantized Look Up Table (LUT) corresponding to a non-linear function comprised in the neural network operation, and a processor configured to perform scale-up on the input data based on a scale factor, to extract a quantized LUT parameter from the quantized LUT based on scaled-up input data, and to generate an operation result by performing a neural network operation based on the quantized LUT parameter.

18 Claims, 9 Drawing Sheets

NN_LUT

(51) Int. Cl.
  G06N 3/048       (2023.01)
  G06N 3/084       (2023.01)

(56)                References Cited

U.S. PATENT DOCUMENTS

| | | | |
|---|---|---|---|
| 8,639,737 | B2 | 1/2014 | Shearer |
| 10,037,306 | B2 | 7/2018 | Lin et al. |
| 11,182,666 | B1 * | 11/2021 | Phebus ................. G06N 3/063 |
| 2018/0060278 | A1 | 3/2018 | Lin et al. |
| 2019/0147323 | A1 | 5/2019 | Li et al. |
| 2021/0034982 | A1 | 2/2021 | Sather et al. |
| 2021/0303977 | A1 | 9/2021 | Sun et al. |

OTHER PUBLICATIONS

Yang, Wen-Chang, Shu-Yun Lin, and Tsung-Chu Huang. "Range-lookup approximate computing acceleration for any activation functions in low-power neural network." 2020 IEEE International Conference on Consumer Electronics—Taiwan (ICCE—Taiwan). IEEE, 2020. (Year: 2020).*
Kim, Seok Young, Chang Hyun Kim, and Seon Wook Kim. "Applying piecewise linear approximation for DNN non-linear activation functions to Bfloat16 MACs." 2021 International Conference on Electronics, Information, and Communication (ICEIC). IEEE, 2021. (Year: 2021).*
Korean Office Action issued on Sep. 27, 2024, in counterpart Korean Patent Application No. 10-2021-0138434 (4 pages in English, 6 pages in Korean).
Korean Office Action issued on Jul. 25, 2025, in counterpart Korean Patent Application No. 10-2021-0138434(3 pages in English, 5 pages in Korean).

\* cited by examiner

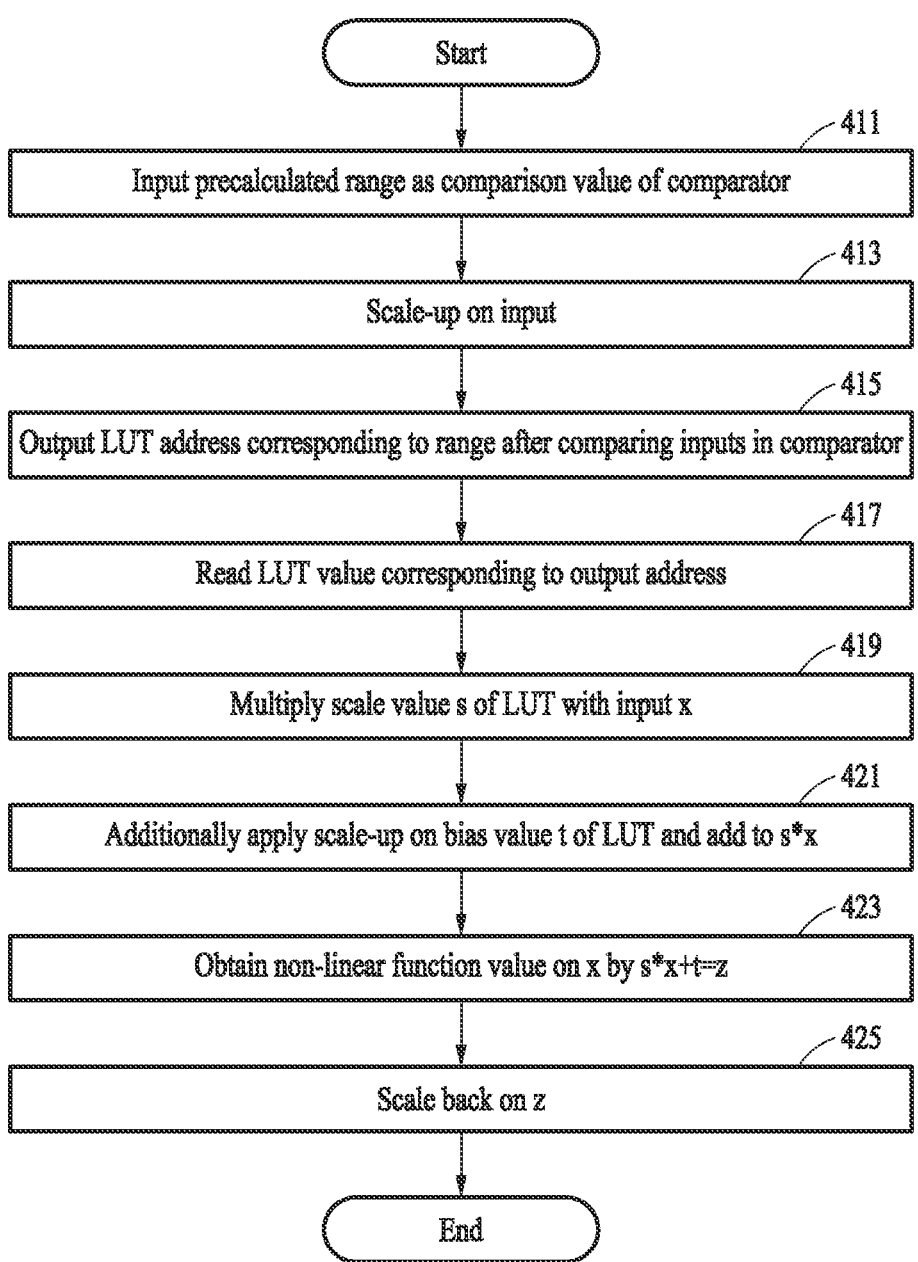

Start

411
Input precalculated range as comparison value of comparator

413
Scale-up on input

415
Output LUT address corresponding to range after comparing inputs in comparator 417
Read LUT value corresponding to output address 419
Multiply scale value s of LUT with input x 421
Additionally apply scale-up on bias value t of LUT and add to s*x 423
Obtain non-linear function value on x by s*x+t=z 425
Scale back on z End

FIG. 4

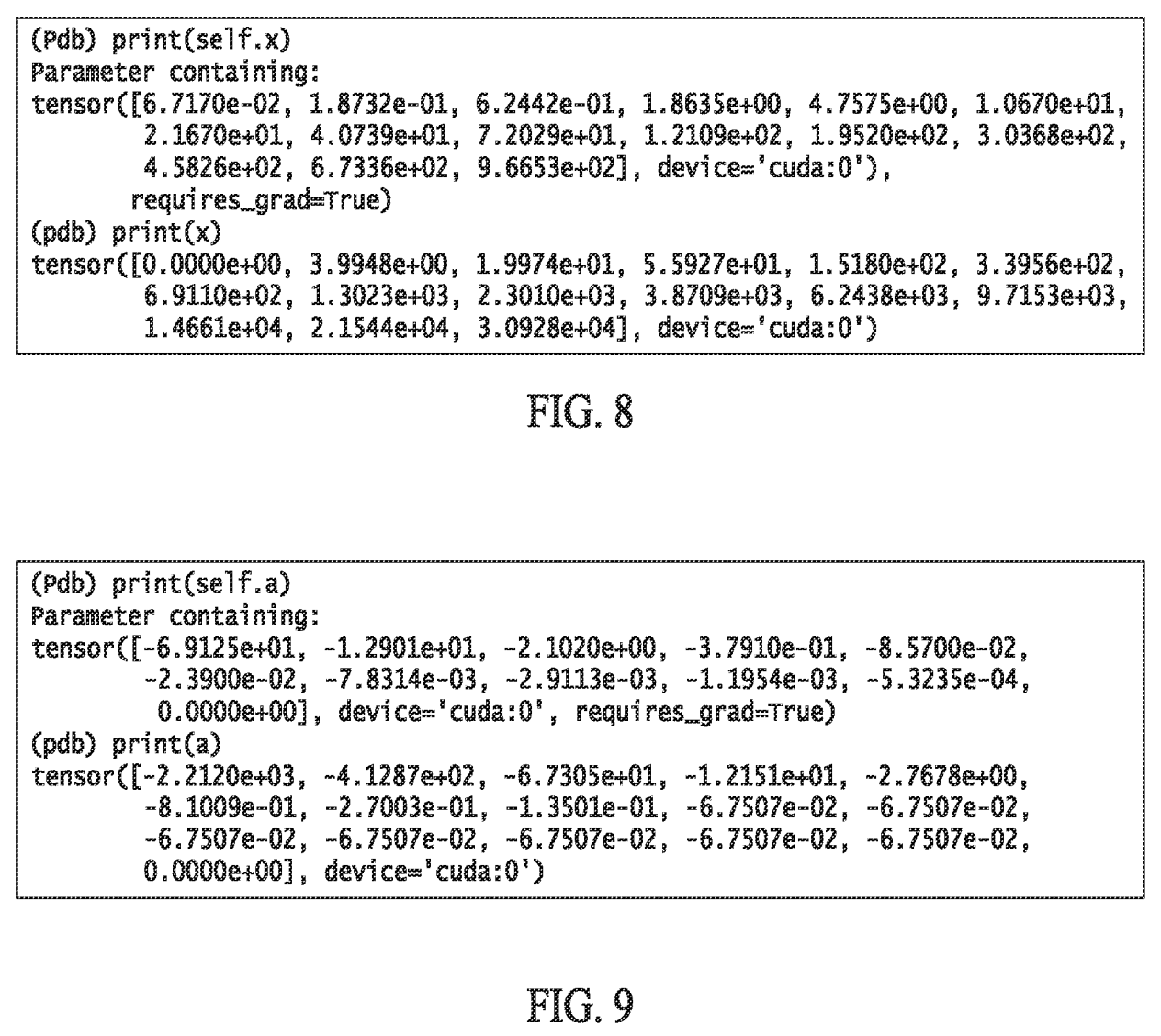

```
(pdb) print(self.x)
Parameter containing:
tensor([6.7170e-02, 1.8732e-01, 6.2442e-01, 1.8635e+00, 4.7575e+00, 1.0670e+01,
        2.1670e+01, 4.0739e+01, 7.2029e+01, 1.2109e+02, 1.9520e+02, 3.0368e+02,
        4.5826e+02, 6.7336e+02, 9.6653e+02], device='cuda:0'),
       requires_grad=True)
(pdb) print(x)
tensor([0.0000e+00, 3.9948e+00, 1.9974e+01, 5.5927e+01, 1.5180e+02, 3.3956e+02,
        6.9110e+02, 1.3023e+03, 2.3010e+03, 3.8709e+03, 6.2438e+03, 9.7153e+03,
        1.4661e+04, 2.1544e+04, 3.0928e+04], device='cuda:0')
```

FIG. 8

```
(pdb) print(self.a)
Parameter containing:
tensor([-6.9125e+01, -1.2901e+01, -2.1020e+00, -3.7910e-01, -8.5700e-02,
        -2.3900e-02, -7.8314e-03, -2.9113e-03, -1.1954e-03, -5.3235e-04,
         0.0000e+00], device='cuda:0', requires_grad=True)
(pdb) print(a)
tensor([-2.2120e+03, -4.1287e+02, -6.7305e+01, -1.2151e+01, -2.7678e+00,
        -8.1009e-01, -2.7003e-01, -1.3501e-01, -6.7507e-02, -6.7507e-02,
        -6.7507e-02, -6.7507e-02, -6.7507e-02, -6.7507e-02,
         0.0000e+00], device='cuda:0')
```

FIG. 9

METHOD AND APPARATUS WITH QUANTIZED LOOK UP TABLE FOR NEURAL NETWORK OPERATION

CROSS-REFERENCE TO RELATED APPLICATIONS

This application claims the benefit under 35 USC § 119(a) of Korean Patent Application No. 10-2021-0138434, filed on Oct. 18, 2021, in the Korean Intellectual Property Office, the entire disclosure of which is incorporated herein by reference for all purposes.

BACKGROUND

1. Field

The following description relates to a neural network operation method and apparatus.

2. Description of Related Art

In a conventional neural network operation, an error related to a non-linear function may occur when using a Look Up Table (LUT). A range of output values changes rapidly compared to a variation in input values for non-linear functions. Due to the error of the conventional neural network operation method, the prediction accuracy of the neural network model is reduced.

In addition, a large number of LUT indexes are required to approximate a section with a high fluctuation rate, which increases hardware cost. Thus, there is a demand for a neural network operation method that maintains accuracy while maintaining a manageable number of LUT indexes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a neural network operation apparatus comprising a receiver configured to receive input data to perform the neural network operation and a quantized Look Up Table (LUT) corresponding to a non-linear function comprised in the neural network operation, and a processor configured to perform scale-up on the input data based on a scale factor, to extract a quantized LUT parameter from the quantized LUT based on scaled-up input data, and to generate an operation result by performing a neural network operation based on the quantized LUT parameter.

The quantized LUT may be generated by quantizing an LUT based on a slope of a linear function that approximates the non-linear function, an offset of the linear function, and a decision boundary based on a range of the input data.

The processor may be configured to determine whether to perform scale-up on the input data by comparing the input data and a threshold value.

The processor may be configured to perform scaling on the slope and the offset based on the quantized LUT parameter, in response to the scaled-up input data being within the decision boundary.

The processor may be configured to obtain a bias and a scale factor of an address corresponding to the input data in the quantized LUT parameter, to generate converted data by converting the scaled-up input data based on the scale factor and the bias, and to generate the operation result based on the converted data.

The processor may be configured to perform scale back on the operation result.

The decision boundary may be converted based on a scale parameter and the quantized LUT parameter may be generated by scaling an LUT parameter based on the scale parameter and a square of the scale parameter.

The scale parameter may be a power of 2.

In another general aspect, there is provided a neural network operation apparatus including a receiver configured to receive input data to perform the neural network operation and a Look Up Table (LUT) corresponding to a non-linear function comprised in the neural network operation, and a processor configured to perform scale-up on the input data based on a scale factor, extract an LUT parameter from the LUT based on scaled-up input data, and generate an operation result by performing a neural network operation based on the LUT parameter.

The processor may be configured to perform scaling on a slope of a linear function that approximates the non-linear function and an offset of the linear function based on the LUT parameter, in response to the scaled-up input data within a decision boundary calculated using a range of input data.

The processor may be configured to determine whether to perform scale-up on the input data by comparing the input data and a threshold value.

The processor may be configured to obtain a bias and a scale factor of an address corresponding to the input data in the LUT parameters, to generate converted data by converting the scaled-up input data based on the scale factor and the bias, and to generate the operation result based on the converted data.

The processor may be configured to perform scale back on the operation result.

In another general aspect, there is provided a neural network operation method including receiving input data to perform the neural network operation and a quantized Look Up Table (LUT) corresponding to a non-linear function comprised in the neural network operation, performing scale-up on the input data based on a scale factor, extracting a quantized LUT parameter from the quantized LUT based on scaled-up input data, and generating an operation result by performing a neural network operation based on the quantized LUT parameter.

The quantized LUT may be generated by quantizing an LUT based on a slope of a linear function that approximates the non-linear function, an offset of the linear function, and a decision boundary based on a range of input data.

The performing of the scale-up may include determining whether to perform scale-up on the input data by comparing the input data and a threshold value.

The performing of the scale-up may include performing scaling on the slope and the offset based on the quantized LUT parameter, in response to the scaled-up input data being within the decision boundary.

The generating of the operation result may include obtaining a bias and a scale factor of an address corresponding to the input data in the quantized LUT parameter, generating converted data by converting the scaled-up input data based on the scale factor and the bias, and generating the operation result based on the converted data.

The neural network operation may include performing scale back on the operation result.

The decision boundary may be converted based on a scale parameter and the quantized LUT parameter may be generated by scaling an LUT parameter based on the scale parameter and a square of the scale parameter.

The scale parameter may be a power of 2.

Other features and aspects will be apparent from the following detailed description, the drawings, and the claims.

BRIEF DESCRIPTION OF THE DRAWINGS

FIG. 4 illustrates an example of calculating a non-linear function value using an LUT.

FIG. 8 illustrates an example of a quantization result of an LUT parameter.

FIG. 9 illustrates an example of a quantization result of an LUT parameter.

Figure 1:
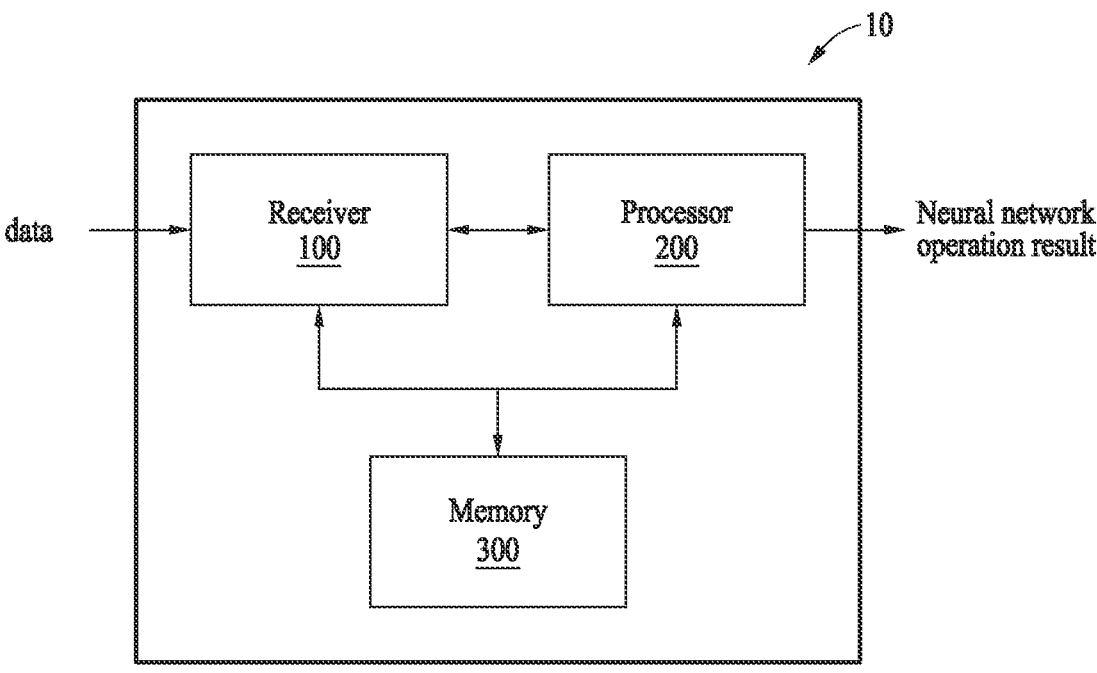
FIG. 1 illustrates an example of a neural network operation apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The terminology used herein is for describing various examples only and is not to be used to limit the disclosure. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The use of the term "may" herein with respect to an example or embodiment (e.g., as to what an example or embodiment may include or implement) means that at least one example or embodiment exists where such a feature is included or implemented, while all examples are not limited thereto.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 illustrates an example of a neural network operation apparatus.

Referring to FIG. 1, a neural network operation apparatus 10 may perform a neural network operation. The neural network operation apparatus 10 may perform an operation on a non-linear function included in a neural network operation.

The neural network operation apparatus 10 may perform an operation on the non-linear function using a Look Up Table (LUT). The neural network operation 10 may perform the neural network operation using quantization.

In performing an integer operation, the neural network operation apparatus 10 may enhance power efficiency by quantizing an LUT value to an integer and may reduce errors that may occur in quantization.

The neural network may be a general model that has the ability to solve a problem, where artificial neurons (nodes) forming the network through synaptic combinations change a connection strength of synapses through training.

The neural network or an artificial neural network (ANN) may generate mapping between input patterns and output patterns, and may have a generalization capability to generate a relatively correct output with respect to an input pattern that has not been used for training. The neural network may refer to a general model that has an ability to solve a problem, where nodes form the network through synaptic combinations change a connection strength of synapses through training.

The neural network may be a model with a machine learning structure designed to extract feature data from input data and to provide an inference operation based on the feature data. The feature data may be data associated with a feature obtained by abstracting input data. If input data is an image, feature data may be data obtained by abstracting the image and may be represented in a form of, for example, a vector. The neural network may map input data and output data that are in a nonlinear relationship based on deep learning, to perform inference operation. The deep learning, which is a machine learning method used for inference operation and tasks such as speech recognition or speech transliteration from a big data set, may map input data and output data to each other through supervised and/or unsupervised learning.

The inference operation may include, for example, pattern recognition (e.g., object recognition, facial identification, etc.), sequence recognition (e.g., speech, gesture, and written text recognition, machine translation, machine interpretation, machine transliteration etc.), control (e.g., vehicle control, process control, etc.), recommendation services, decision making, medical diagnoses, financial applications, data mining, and the like.

The neural network may be implemented as an architecture having a plurality of layers including an input image, feature maps, and an output. In the neural network, the input image may be convoluted with a filter called weights, and as a result, a plurality of feature maps may be output. The output feature maps may be again convoluted as input feature maps with the weights, and a plurality of new feature maps may be output. After the convolution operations are repeatedly performed, the recognition results of features of the input image through the neural network may be finally output.

For example, when an image of a 24×24 pixel size is input to the neural network, the input image may be output as feature maps of 4 channels each having a 20×20 size through a convolution operation with weights. Also, some of the pixel values of the feature maps of 4 channels each having the 20×20 size may be subject to a sub-sampling operation, such as, for example, max-pooling and average-pooling, to output feature maps of 4 channels each having a 10×10 size. In an example, the 10×10 feature maps may be repeatedly subject to convolution operations and sub-sampling operations with weights so that the sizes of the 10×10 feature maps may be reduced, and global features may be output. The neural network may repeatedly perform convolution operations and sub-sampling (or pooling) operations on the several layers to filter robust features, i.e., global features that are capable of representing the input image from the input image, to output the global features, and to input the global features to the fully connected layer, thereby recognizing the input image.

In another example, the neural network may receive an input source sentence, (e.g., voice entry) instead of an input image. In such an example, a convolution operation is performed on the input source sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be output through the neural network.

In an example, training an artificial neural network may indicate determining and updating weights and biases between layers or weights and biases among a plurality of nodes belonging to different layers adjacent to one another. In an example, weights and biases of a plurality of layered structures, a plurality of layers, or nodes may be collectively referred to as connectivity of an artificial neural network. Therefore, training an artificial neural network may indicate construction and training of the connectivity.

The neural network may include a deep neural network (DNN). The neural network may include a convolutional neural network (CNN), a recurrent neural network (RNN), a perceptron, a multiplayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme training machine (ELM), an echo state network (ESN), a deep residual network (DRN), a differentiable neural computer (DNC), a neural turning machine (NTM), a capsule network (CN), a Kohonen network (KN), and an attention network (AN).

The neural network operation apparatus 10 may be implemented in a personal computer (PC), a data server, or a portable device.

The portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, a smart vehicle, an autonomous vehicle, or a smart device. The smart device may be implemented as a smart watch, a smart band, or a smart ring.

The neural network operation apparatus 10 may be applied to an accelerator to run a neural network that requires a non-linear function operation. The neural network operation apparatus 10 may be applied to an accelerator that performs an operation in a low-precision mode by converting data into an integer.

In performing an operation on the non-linear function, the neural network operation apparatus 10 may reduce a hardware cost and a latency by using an LUT and quantization.

The neural network operation apparatus 10 may reduce an error in calculating by approximating the non-linear function. For example, in response to a significant error occurring in approximating a layer normalization operation used in a neural network that uses a transformer module by $1/\mathrm{sqrt}(x)$, the neural network operation apparatus 10 may correct the error by applying scaling on input data and output data. A process of applying the scaling may include a shift operation.

The neural network operation apparatus 10 includes a receiver 100 and a processor 200. The neural network operation apparatus 10 may further include a memory 300.

The receiver 100 may receive data related to a neural network. The receiver 100 may receive input data to perform a neural network operation, a quantized LUT or an LUT corresponding to a non-linear function included in the neural network operation and input data to perform the neural network operation. The receiver 100 may include a receiving interface. The receiver 100 may output received data to the processor 200. The data related to the neural network may include a model parameter (or, a weight) of the neural network, input data to perform the neural network operation, data output from the neural network, training data, or information related to the neural network operation.

The processor 200 may process data stored in the memory 300. The processor 200 may execute a computer-readable code (for example, software) stored in the memory 300 and instructions triggered by the processor 200.

The processor 200 may be a data processing device implemented by hardware including a circuit having a physical structure to perform desired operations. For example, the desired operations may include code or instructions included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA). Further details regarding the processor 200 is provided below.

The processor 200 may perform scale-up on input data based on a scale factor. The processor 200 may determine whether to perform scale-up on the input data by comparing the input data and a predetermined threshold value.

The processor 200 may generate an LUT corresponding to the non-linear function included in the neural network operation. The processor 200 may train a neural network based on the non-linear function. The processor 200 may calculate a range value based on a bias and a weight of the trained neural network. The processor 200 may generate an LUT based on the range value.

The processor 200 may quantize an LUT parameter based on a scale factor for quantization of the input data. The processor 200 may quantize the LUT based on a decision boundary based on a slope of a linear function approximating the non-linear function, an offset of the linear function, and a range of the input data.

The processor 200 may extract a quantized LUT parameter from the quantized LUT based on the scaled-up input data. The processor 200 may extract the LUT parameter from the LUT based on the scaled-up input data.

The quantized LUT may be generated by quantizing the LUT based on the slope of the linear function approximating the non-linear function, the offset of the linear function, and the decision boundary calculated using the range of the input data.

For scaled-up input data within the decision boundary, the processor 200 may scale a slope of the linear function, the offset of the linear function, and the input data based on the LUT parameter or the quantized LUT parameter.

The decision boundary may be converted based on the scale parameter. The quantized LUT parameter may be generated by performing scaling on the LUT parameter based on the scale parameter and a square of the scale parameter.

The processor 200 may convert the decision boundary based on the scale parameter. The processor 200 may perform scaling on the LUT parameter based on the scale parameter and the square of the scale parameter. In an example, the scale parameter may be a power of 2.

The processor 200 may perform the neural network operation based on the quantized LUT parameter. The processor 200 may obtain a bias and a scale factor of an address corresponding to the input data in the quantized LUT parameter or the LUT parameter. The processor 200 may generate converted data by converting the scaled-up input data based on the scale factor and the bias. The processor 200 may calculate an operation result (for example, an operation result of the non-linear function) based on the converted data.

The processor 200 may perform scale back on the operation result. The processor 200 may perform scale back on the converted data. The processor 200 may perform scale-up on the input data based on the scale factor.

The memory 300 may store data for an operation or an operation result. The memory 300 stores instructions (or programs) executable by the processor 200. For example, the instructions may include instructions for executing an operation of the processor and/or instructions for performing an operation of each component of the processor.

The memory 300 may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nano-tube RRAM, a polymer RAM (PoRAM), a nano floating gate Memory (NFGM), a holographic memory, a molecular electronic memory device), or an insulator resistance change memory. Further details regarding the memory 300 is provided below.

Figure 2:
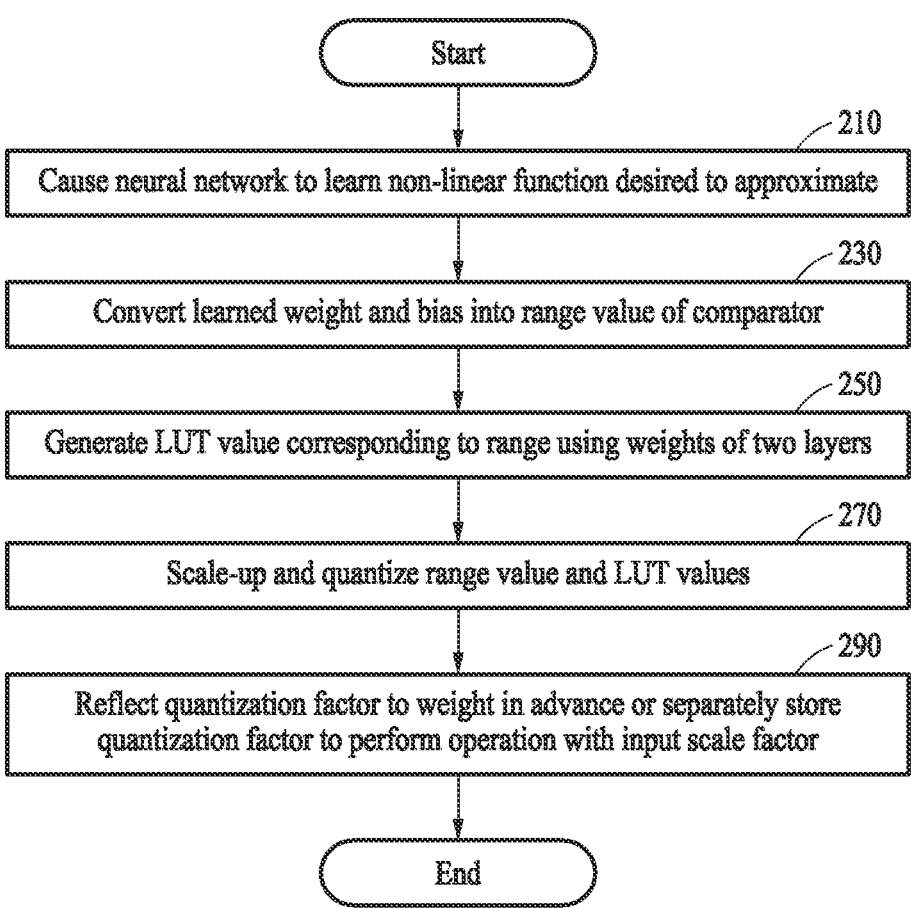
FIG. 2 illustrates an example of an operation of generating a Look Up Table (LUT).

FIG. 2 illustrates an example of operations of generating an LUT. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, a processor (for example, the processor 200 of FIG. 1) may generate an LUT corresponding to a non-linear function included in a neural network operation. The processor 200 may generate a quantized LUT parameter by performing quantization on the LUT.

The processor 200 may generate the quantized LUT without increasing hardware cost and without reducing accuracy for performing an integer-only operation. The processor 200 may generate an LUT, may perform scale-up on an LUT parameter, and then, may perform quantization. The processor 200 may reflect a scale factor to a weight of a pre-layer in advance or when performing an operation using a scale factor of the input data, may jointly calculate the scale factor by separately storing the scale factor.

In operation 210, the processor 200 may train a neural network to learn a non-linear function desired to be approximated. In operation 230, the processor 200 may convert a learned weight and a bias to a range value of a comparator.

In operation 250, the processor 200 may generate LUT corresponding to the range value using weights of two layers. In operation 270, the processor 200 may perform quantization by scaling up the range value and LUT values.

In operation 290, the processor 200 may reflect a quantization factor to a weight in advance or may store the quantization factor separately to be calculated with an input scale factor.

Hereinafter, a process of quantizing the LUT is described. Equation 1 may represent an LUT on input data x.

$$LUT_{FP32}(x; \{s_i, t_i\}_{i=1:N}, \{d_i\}_{i=1:N}) \qquad \text{[Equation 1]}$$

In Equation 1, $s_i$ may denote a slope of a linear function approximating a range from $d_{i-1}$ to $d_i$ and $t_i$ may denote an offset of the linear function. d may represent a decision boundary which is a standard for indexing by determining a range of the input data x.

To perform an integer-only operation, the processor 200 may perform quantization that represents $s_i$, $t_i$, and $d_i$ by a scale factor and an integer. The processor 200 may perform quantization on an LUT parameter as Equation 2.

$$s_i x + t_i \approx S_{st} \hat{s_i} * S_x x + S_{st} \hat{t_i}, \text{ if}(S_x \hat{d_i} < S_x \hat{x} < S_x \hat{d_{i+1}}) \qquad \text{[Equation 2]}$$

Here, a value that is the same as a scale factor of input data may be used in quantization of a decision boundary. The processor 200 may perform indexing of an LUT by comparing an x value with an integer-only value by performing scaling on the decision boundary using the value that is the same as the scale factor of the input data.

When scale factors of $\hat{s_i}$ and $\hat{t_i}$ are different, a separate module may perform a floating point operation in an LUT operation process. In response to a scale factor which is commonly used by $\hat{s_i}$ and $\hat{t_i}$, the processor 200 may separately calculate a scale factor and a scale factor of the input data as Equation 3, or may reflect to a parameter of a pre-layer in advance.

$$S_{st} \hat{s_i} * S_x \hat{x} + S_{st} \hat{t_i} = S_{st} S_x (\hat{s_i} * x + \hat{t_i}) \qquad \text{[Equation 3]}$$

The processor 200 may convert the decision boundary based on the scale parameter. The processor 200 may perform scaling on the LUT parameter based on the scale parameter and the square of the scale parameter. The scale parameter may be a power of 2.

The processor 200 may perform an LUT operation that approximates a non-linear function using an integer-only operation using the method described with reference to Equations 1 to 3t.

The processor 200 may perform quantization by converting the LUT parameter to prevent the LUT parameter from being converged to a value due to a limit in a quantization resolution.

For example, to prevent input data from being calculated by an unintended linear function because the input data intended to be mapped onto $d_{i+2} \sim d_{i+3}$ is mapped onto due to a quantization error, or an error occurring in an operation result because a quantization error which is greater than a real value is reflected to a slope and an offset of the linear function, the processor 200 may perform quantization by converting the LUT parameter.

The processor 200 may calculate the non-linear function by performing scale-up such that a quantization error is relatively less than a value of the LUT parameter, and may perform scale back. The processor 200 may perform scale-up using Equation 4.

$$LUT_{FP32}(ax; \{as_i, a^2 t_i\}_{i=1:N}, \{ad_i\}_{i=1:N})$$

In equation 4, "a" may denote a scale parameter. The processor 200 may reflect a scale parameter a, represented by a power of two, and $a^2$ to an LUT parameter in advance, and may perform quantization based on the LUT parameter to which the scale parameter is reflected. The processor 200 may scale back input data reflecting the scale parameter a and an operation result of LUT by $a^2$. Equation 4 may show that an operation result after performing scale back is the same as an operation result before performing scale-up.

$$s_i x + t_i = (as_i ax + a^2 t_i)/a^2 \approx (aS_{st}\hat{s_i} * aS_x \hat{x} + a^2 S_{st}\hat{t_i})/a^2, \qquad \text{[Equation 5]}$$

$$\text{if } (S_{x} a \hat{d_i} < aS_x x < S_x a \hat{d_{i+1}})$$

The processor 200 may calculate a scale factor $$S_{st}^a$$

using $as_i$, $at_i$ to which the scale parameter is reflected and may store as an LUT parameter by quantizing the calculated result into an integer. The processor 200 may convert a decision boundary using an $ad_i$ value. The processor 200 may quantize a scale factor of input data into $S_x$ and perform scale-up on the input data $\hat{x}$.

The processor 200 may perform an operation by performing additional scale-up on $t_i$ by a. An error due to index mismatching of an LUT may be significantly reduced by converting an LUT parameter using Equations 4 and 5.

Figure 3:
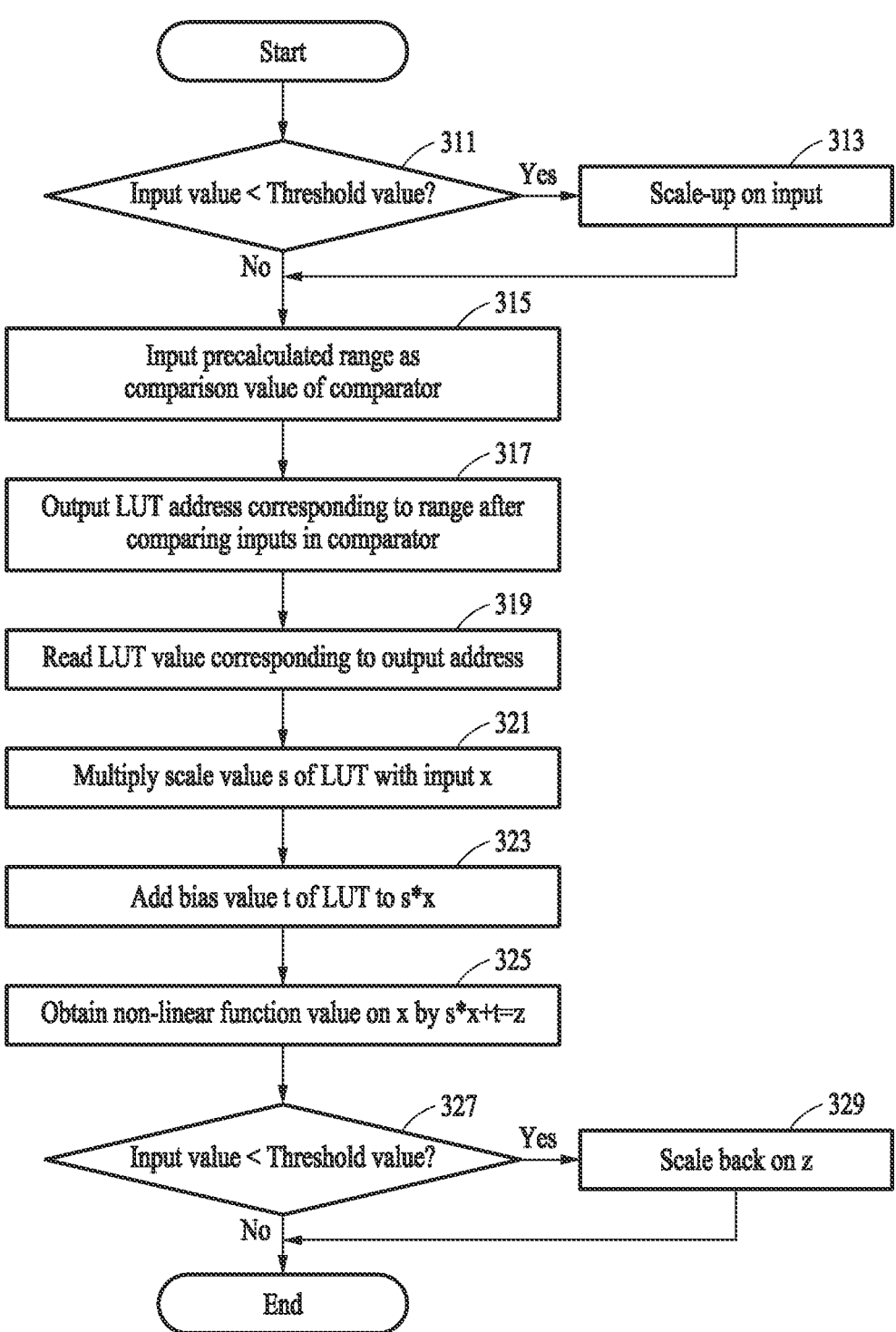
FIG. 3 illustrates an example of calculating a non-linear function value using an LUT.

FIG. 3 illustrates an example of calculating a non-linear function value using an LUT. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer, such as a processor, that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, a processor (for example, the processor 200 of FIG. 1) may perform preprocessing for a neural network operation. The processor 200 may train a target non-linear function by a neural network. In an example, the non-linear function may include Gaussian error Linear Unit (GeLU), sigmoid, reciprocal square root, swish, and layer normalization.

The processor 200 may calculate a range value using a bias and a weight of the neural network. The processor 200 may calculate a scale value and a bias value of an LUT using a product of the weight.

In operation 311, the processor 200 may determine whether an input value (for example, input data) is less than a threshold value. In operation 313, when the input value is less than the threshold value, the processor 200 may perform scale-up on input data. The threshold value may vary based on a neural network operation or a type of the non-linear function. For example, the threshold value may be 1.

When a change in output data is rapid compared to a change in the input data, the processor 200 may reduce a loss in accuracy by performing scale-up on input data on which quantization is not performed and performing scale back on output data on which the neural network operation is performed.

The processor 200 may perform scale up on input data included in a range in which output data may rapidly change when there is a small change in the input data to a range in which output data may smoothly change. The processor 200 may secure mathematical identity by performing scale back on a result of using the scaled-up input data.

For example, the processor 200 may perform scaling to perform an operation on a reciprocal square root function using Equation 6.

$$1/SQRT(x) = \frac{1}{\sqrt{x}} = \frac{1}{\sqrt{a \cdot x \cdot \frac{1}{a}}} = \sqrt{a} \cdot \left(\frac{1}{\sqrt{a \cdot x}}\right)_{LUT} \qquad \text{[Equation 6]}$$

In Equation 6, "a" may denote a scale parameter. In an example, when a is a power of 2 such as $2^{10}$, the processor 200 may calculate a function value of Equation 6 by a simple bit-shift operation.

Since small errors may occur in a range in which output data smoothly changes in response to a change in input data when approximating to an LUT is being performed, the processor 200 may calculate back original output data based on a value of the range in which the output data smoothly changes. The processor 200 may apply the above-described scaling operations to a function that y corresponds to an x-axis.

In operation 315, when the input value is greater than or equal to the threshold value, the processor 200 may input a precalculated range as a comparison value of a comparator.

In operation 317, the processor 200 may output an LUT address corresponding to the range after comparing the input in the comparator. In operation 319, the processor 200 may read an LUT value (for example, an LUT parameter) corresponding to the output LUT address.

The processor 200 may generate converted data by converting the input data using the scale factor and the bias. In operation 321, the processor 200 may multiply the scale factor s of the LUT and input data x. In operation 323, the processor 200 may add a bias value t of the LUT to s*x. In operation 325, the processor 200 may obtain a non-linear function value using the converted data s*x+t=z.

In operation 327, the processor 200 may determine whether the input value is less than the threshold value. In operation 329, the processor 200 may perform scale back on z when the input value is less than the threshold value. When the input value is greater than or equal to the threshold value, the processor 200 may output the obtained function value and may terminate the operation.

FIG. 4 illustrates an example of calculating a non-linear function value using an LUT. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, a processor (for example, the processor 200 of FIG. 1) may perform an operation using a quantized LUT without increasing hardware cost and without reducing accuracy for performing an integer-only operation.

The processor 200 may perform scale-up which is same as the scale-up described with respect to FIG. 2 or FIG. 3 and may perform scale back on an operation result after additionally performing scale-up on a bias in the process of performing an operation using an LUT parameter on the input data.

In operation 411, a precalculated range may be input as a comparison value of a comparator.

In operation 413, the processor 200 may perform scale-up on input data. A process of performing scale-up on the input data may be same as the process described in FIG. 3.

In operation 415, after comparing the input in the comparator, the processor 200 may output an LUT address within a corresponding range. The LUT may be generated by a method that is the same as the method described with reference to FIG. 2.

In operation 417, the processor 200 may read an LUT value corresponding to the output address. In operation 419, the processor 200 may multiply a scale factor s of the LUT and input data x. In operation 421, the processor 200 may additionally perform scale-up on a bias value t of the LUT and may add to s*x.

In operation 423, the processor 200 may obtain a non-linear function value of x by s*x+t=z. In operation 425, the processor 200 may perform scale back on z.

Figure 5:
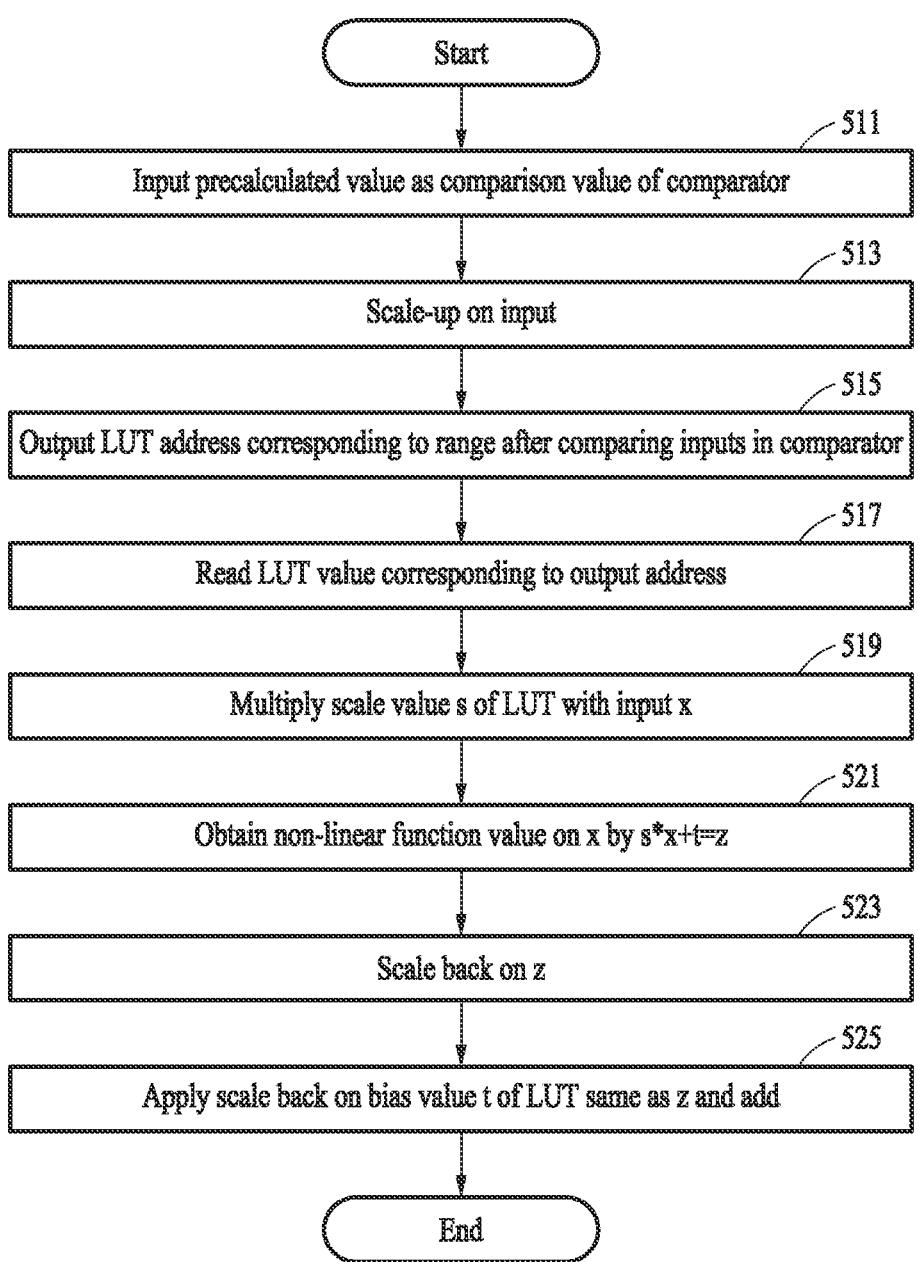
FIG. 5 illustrates an example of calculating a non-linear function value using an LUT.

FIG. 5 illustrates an example of calculating a non-linear function value using an LUT. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, unlike the example of FIG. 4, a processor (for example, the processor 200 of FIG. 1) may perform scale back on a result of s*x and then, may perform scale back on the bias.

In operation 511, the processor 200 may input a precalculated range as a comparison value of a comparator. In operation 513, the processor 200 may perform scale-up on input. In operation 515, the processor 200 may output an LUT address within a corresponding range, after comparing the input in the comparator. In operation 517, the processor 200 may read an LUT value corresponding to the output address.

In operation 519, the processor 200 may multiply a scale factor s of the LUT and input data x. In operation 521, the processor 200 may obtain a non-linear function value of x by s*x+t=z.

In operation 523, the processor 200 may perform scale back on z. In operation 525, the processor 200 may perform scale back, which is the same as z, on the bias value t of the LUT and may add scaled back performed two values.

Figure 6:
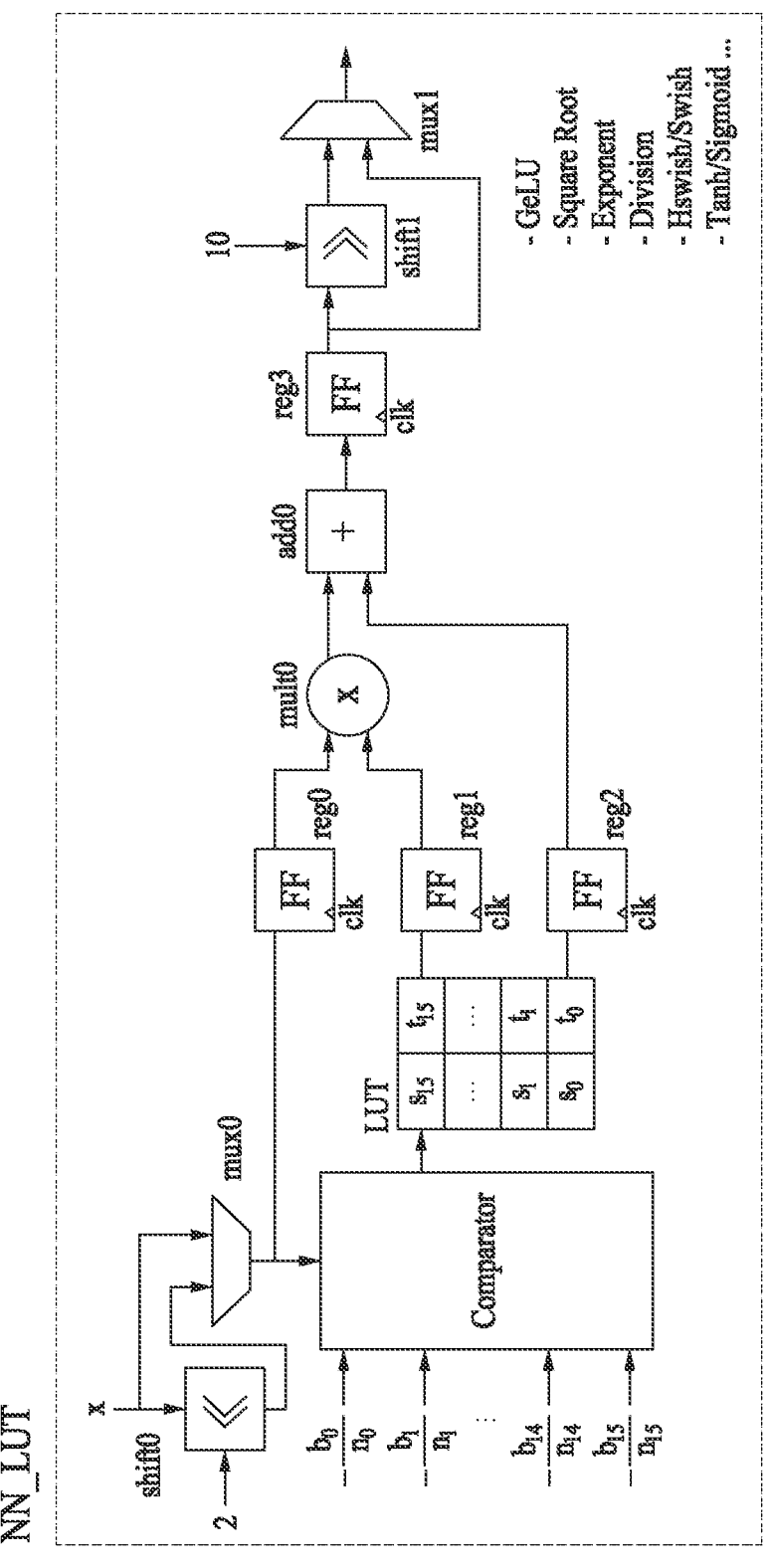
FIG. 6 illustrates an example of a hardware implementation performing an LUT operation.
Figure 7:
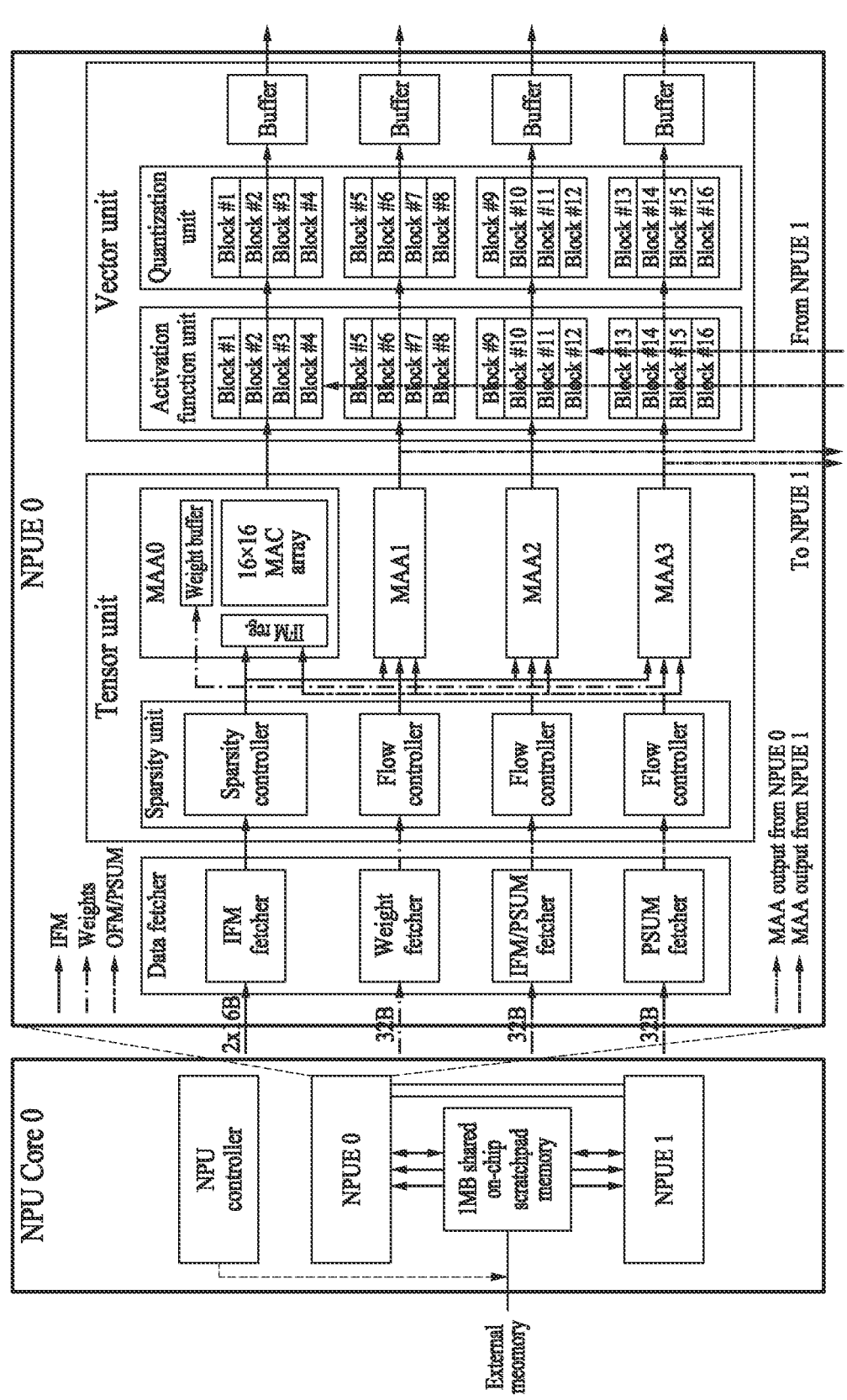
FIG. 7 illustrates an example of implementation of a neural network operation apparatus.

FIG. 6 illustrates an example of a hardware implementation performing an LUT operation. FIG. 7 illustrates an example of implementation of a neural network operation apparatus.

Referring to FIGS. 6 and 7, a processor (for example, the processor 200 of FIG. 1) may include a shifter 610 to perform scale-up or scale back on input data and an LUT. The shifter may be disposed as shown in FIG. 6.

Exemplary hardware area, power consumption and latency of the shifter is shown by Table 1. Referring to Table 1, compared to INT32 and FP16 based on the INT16 operation, the processor 200 shows superior performance.

TABLE 1

| | Int 8 | Int 16 | Int 32 | FP 16 | FP32 |
|---|---|---|---|---|---|
| NN_LUT (hidden 16) | | | | | |
| Area [um2] | 171.7848 | 422.5932 | 1008.92 | 498.3768 | 1133.595 |
| Power [mW] | 1.29E−02 | 3.46E−02 | 5.91E−02 | 2.50E−02 | 4.37E−02 |
| Latency [ns] | 0.84 | 1.62 | 1.36 | 2.72 | 3.2 |
| NN_LUT (hidden 16) with shift | | | | | |
| Area [um2] | | 430.596 | | | |
| Power [mW] | | 4.44E−02 | | | |
| Latency [ns] | | 1.62 | | | |

FIG. 8 illustrates an example of a quantization result of an LUT parameter. FIG. 9 illustrates another example of a quantization result of an LUT parameter.

Referring to FIGS. 8 and 9, a processor (for example, the processor 200 of FIG. 1) may quantize an LUT parameter and may perform a neural network operation based on the quantized LUT parameter.

The example of FIG. 8 may represent an example of implementation of a neural network operation apparatus (for example, the neural network operation apparatus 10 of FIG. 1). Data may move to a vector unit for an activation operation after a cumulative sum of the data is calculated in a neural processing unit element (NPUE). The processor 200 may calculate a non-linear function using an LUT by the vector unit. Through this process, the processor 200 may obtain an operation result of the non-linear function that is highly accurate.

Table 2 may represent a result of applying the neural network operation method described with reference to FIGS. 2 to 5 to a MRPC task of a RoBERTa model. Referring to Table 2, an increase in a number of LUT indexes may represent an increase in hardware cost.

In Table 2, a result of performing scale-up on input data based on a threshold value and a process of performing scale back on output data are applied is represented by +Scale.

To reduce a quantization error, a result to which a scaled-up LUT parameter is applied is represented by +AllScale_Nbit, and may imply that the scale-up is applied by $2^N$.

TABLE 2

| | RoBERTa | MRPC | |
|---|---|---|---|
| | FP32 Base | 90.4 | Acc. drop |
| | LayerNorm LUT | — | |
| FP32 Base (Softmax, GELU FP32 + 16 Index LUT) | FP32 + 32 Index LUT | 90.7 | 0.3 |
| | FP32 + 16 Index LUT | 90 | −0.4 |
| | FP32 + 16 Index LUT + Scale | 90.2 | −0.2 |
| INT8 Base (Softmax, GELU INT32 + 16 Index LUT) | INT32 + 32 Index LUT | 89.5 | −0.9 |
| | INT32 + 16 Index LUT | 87.7 | −2.7 |
| | INT32 + 16 Index LUT + Scale | 88.2 | −2.2 |
| INT8 Base (Softmax, GELU INT16 + 16 Index LUT) | INT32 + 32 Index LUT | 88.7 | −1.7 |
| | INT32 + 32 Index LUT + Scale | 89.2 | −1.2 |
| | INT32 + 16 Index LUT | 85.8 | −4.6 |
| | INT32 + 16 Index LUT + Scale | 87.7 | −2.7 |
| | INT16 + 32 Index LUT | 41.7 | −48.7 |
| | INT16 + 32 Index LUT + Scale | 59.3 | −31.1 |
| | INT16 + 16 Index LUT | 42.2 | −48.2 |
| | INT16 + 16 Index LUT + Scale | 48.3 | −42.1 |

TABLE 2-continued

| | RoBERTa | MRPC | |
|---|---|---|---|
| | INT16 + 16 Index LUT + AllScale_5 bit | 84.6 | −5.8 |
| | INT16 + 16 Index LUT + AllScale_10 bit | 86.3 | −4.1 |
| | INT16 + 32 Index LUT + AllScale_5 bit | 76.7 | −13.7 |

Referring to Table 2, a neural network operation apparatus (for example, the neural network operation apparatus 10 of FIG. 1) may prevent accuracy drop in calculating a non-linear function by quantizing to INT16.

The example of FIG. 8 may represent quantization results of a decision boundary, a slope, and an offset in response to a scale parameter, which is $a=2^5$, and may show that a repetitive range is removed due to convergence to 0 in the decision boundary.

The example of FIG. 9 represents that a quantization error of a slope of a linear function may be alleviated while increasing an "a" value, even when scaling by $a=2^5$ is performed.

Figure 10:
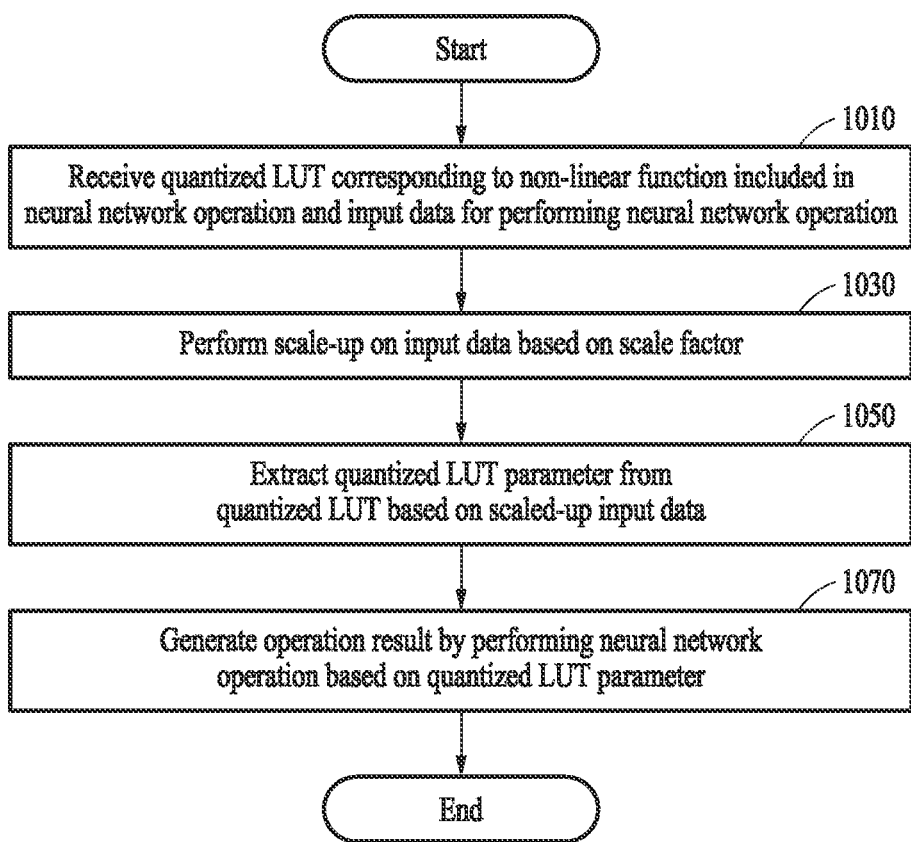
FIG. 10 illustrates an example of an operation of the neural network operation apparatus of FIG. 1.

FIG. 10 illustrates an example of operations of the neural network operation apparatus of FIG. 1. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer, such as a processor, that perform the specified functions, or combinations of special purpose hardware and computer instructions. In addition to the description of FIG. 10 below, the descriptions of FIGS. 1-9 are also applicable to FIG. 4, and are incorporated herein by reference. Thus, the above description may not be repeated here.

Referring to FIG. 10, in operation 1010, a receiver (for example, the receiver 100 of FIG. 1) may receive input data to perform a neural network operation.

In operation 1030, the processor 200 may generate an LUT corresponding to a non-linear function included in the neural network operation. The processor 200 may train a neural network based on the non-linear function. The processor 200 may calculate a range value based on a bias and a weight of the trained neural network. The processor 200 may generate an LUT based on the range value.

In operation 1050, the processor 200 may quantize an LUT parameter based on a scale factor for quantizing the input data. The processor 200 may quantize the LUT based on a decision boundary based on a slope of a linear function approximating the non-linear function, an offset of the linear function, and a range of the input data.

When the scaled-up input data is within the decision boundary, the processor 200 may perform scaling on the slope of the linear function, the offset of the linear function, and the input data based on the LUT parameter.

The processor 200 may convert the decision boundary based on the scale parameter. The processor 200 may perform scaling on the LUT parameter based on the scale parameter and the square of the scale parameter. The scale parameter may be a power of 2.

In operation 1070, the processor 200 may perform the neural network operation based on the quantized LUT parameter. The processor 200 may obtain a scale factor and a bias of an address corresponding to input data in the quantized LUT parameter. The processor 200 may generate converted data by converting the input data based on the scale factor and the bias. The processor 200 may calculate an operation result of the non-linear function based on the converted data.

The processor 200 may perform scale back on the converted data. The processor 200 may perform scale-up on the input data based on the scale factor.

The neural network operation apparatus, shifter, comparator, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 2-5 and 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. In an example, the instructions or software includes at least one of an applet, a dynamic link library (DLL), middleware, firmware, a device driver, an application program storing the neural network operation method. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A neural network operation apparatus comprising:
   a receiver configured to receive input data to perform the neural network operation and a quantized Look Up Table (LUT) corresponding to a non-linear function comprised in the neural network operation; and
   a processor configured to perform scale-up on the input data based on a scale factor, to extract a quantized LUT parameter from the quantized LUT based on scaled-up input data, and to generate an operation result by performing a neural network operation based on the quantized LUT parameter,
   wherein the processor is further configured to determine whether to perform the scale-up on the input data by comparing the input data and a threshold value.

2. The neural network operation apparatus of claim 1, wherein the quantized LUT is generated by quantizing an LUT based on a slope of a linear function that approximates the non-linear function, an offset of the linear function, and a decision boundary based on a range of the input data.

3. The neural network operation apparatus of claim 2, wherein the processor is further configured to perform scaling on the slope and the offset based on the quantized LUT parameter, in response to the scaled-up input data being within the decision boundary.

4. The neural network operation apparatus of claim 1, wherein the processor is further configured to obtain a bias and a scale factor of an address corresponding to the input data in the quantized LUT parameter, to generate converted data by converting the scaled-up input data based on the scale factor and the bias, and to generate the operation result based on the converted data.

5. The neural network operation apparatus of claim 1, wherein the processor is further configured to perform scale back on the operation result.

6. The neural network operation apparatus of claim 2, the processor is further configured to convert the decision boundary based on a scale parameter and to generate the quantized LUT parameter by scaling an LUT parameter based on the scale parameter and a square of the scale parameter.

7. The neural network operation apparatus of claim 6, wherein the scale parameter is a power of 2.

8. A neural network operation apparatus comprising: a receiver configured to receive input data to perform the neural network operation and a Look Up Table (LUT) corresponding to a non-linear function comprised in the neural network operation; and
   a processor configured to perform scale-up on the input data based on a scale factor, extract an LUT parameter from the LUT based on scaled-up input data, and generate an operation result by performing a neural network operation based on the LUT parameter,
   wherein the processor is further configured to determine whether to perform the scale-up on the input data by comparing the input data and a threshold value.

9. The neural network operation apparatus of claim 8, wherein the processor is further configured to perform scaling on a slope of a linear function that approximates the non-linear function and an offset of the linear function based on the LUT parameter, in response to the scaled-up input data within a decision boundary calculated using a range of input data.

10. The neural network operation apparatus of claim 8, wherein the processor is further configured to obtain a bias and a scale factor of an address corresponding to the input data in the LUT parameters, to generate converted data by converting the scaled-up input data based on the scale factor and the bias, and to generate the operation result based on the converted data.

11. The neural network operation apparatus of claim 8, wherein the processor is further configured to perform scale back on the operation result.

12. A neural network operation method comprising: receiving input data to perform the neural network operation and a quantized Look Up Table (LUT) corresponding to a non-linear function comprised in the neural network operation; performing scale-up on the input data based on a scale factor;

extracting a quantized LUT parameter from the quantized LUT based on scaled-up input data; and
generating an operation result by performing a neural network operation based on the quantized LUT parameter,
wherein the performing of the scale-up comprises determining whether to perform the scale-up on the input data by comparing the input data and a threshold value.

13. The neural network operation method of claim 12, wherein the quantized LUT is generated by quantizing an LUT based on a slope of a linear function that approximates the non-linear function, an offset of the linear function, and a decision boundary based on a range of input data.

14. The neural network operation method of claim 13, wherein the performing of the scale-up comprises performing scaling on the slope and the offset based on the quantized LUT parameter, in response to the scaled-up input data being within the decision boundary.

15. The neural network operation method of claim 12, wherein the generating of the operation result comprises:
obtaining a bias and a scale factor of an address corresponding to the input data in the quantized LUT parameter;
generating converted data by converting the scaled-up input data based on the scale factor and the bias; and
generating the operation result based on the converted data.

16. The neural network operation method of claim 12, further comprising:
performing scale back on the operation result.

17. The neural network operation method of claim 13, further comprising converting the decision boundary based on a scale parameter and generating the quantized LUT parameter by scaling an LUT parameter based on the scale parameter and a square of the scale parameter.

18. The neural network operation method of claim 17, wherein the scale parameter is a power of 2.

* * * * *